United States Patent [19]

Tompsett

[11] 3,881,117

[45] Apr. 29, 1975

[54] INPUT CIRCUIT FOR SEMICONDUCTOR CHARGE TRANSFER DEVICES

[75] Inventor: Michael Francis Tompsett, New Providence, N.J.

[73] Assignee: Bell Telephone Laboratories, Incorporated, Murray Hill, N.J.

[22] Filed: Sept. 10, 1973

[21] Appl. No.: 395,388

[52] U.S. Cl. ................. 307/221 D; 307/208; 357/24
[51] Int. Cl. ........................ G11c 11/34; G11c 27/00
[58] Field of Search ............ 307/304, 221 C, 221 D, 307/208, 203; 357/24

[56] References Cited

UNITED STATES PATENTS 3,760,202 9/1973 Kosonocky ........................ 307/304

OTHER PUBLICATIONS

Electronics, December, 1971, "The Pluses and Minuses of Charge Transfer Devices," by Engeler et al., pp. 86–90.

IEEE Journal of Solid State Circuits, Vol. SC–6, No. 5, October 1971, pp. 306–313, "A Memory System Based on Surface–Charge Transport," by Engeler et al.

*Primary Examiner*—John Zazworsky
*Attorney, Agent, or Firm*—D. I. Caplan

[57] ABSTRACT

In order to provide an analog signal input charge to a semiconductor charge transfer device (CTD), so that the input charge is independent of the input surface channel characteristics of the semiconductor, an input signal circuit is provided which transfers both signal-independent input charges from a charge source to the first transfer site of the CTD and signal-dependent charges from this site back to the charge source. Thereby, the net input charge to this first transfer site is substantially insensitive to the semiconductor surface channel characteristics and represents a linear analog of the input signal.

10 Claims, 4 Drawing Figures

PATENTED APR 29 1975 3,881,117

INPUT CIRCUIT FOR SEMICONDUCTOR CHARGE TRANSFER DEVICES

FIELD OF THE INVENTION

This invention relates to the field of semiconductor apparatus and, more particularly, to semiconductor shift register apparatus operating by means of sequential electrical charge transfers in a semiconductor medium.

BACKGROUND OF THE INVENTION

In the prior art, shift-register operation has been achieved in semiconductor devices by means of the electrically controlled shifting of localized accumulations of charges in a semiconductor medium. Such charges are controllably translated through the semiconductor by means of applied clock voltages which transfer electrical charges from one storage site to the next in the semiconductor device. Thus, such a semiconductor shift-register is, in effect, a type of charge transfer device (CTD). These devices are useful in such applications as delay lines and optical imaging apparatus.

Charge transfer devices in the semiconductor art fall into two main categories the so-called "charge-coupled device" (CCD) and the integrated circuit versions of the bucket-brigade device (BBD). In either category, a spatially periodic electrode metallization pattern on a major surface of a semiconductor body coated with oxide defines a sequence of integrated MOS (metal-oxide-semiconductor) type capacitors, so that localized electrical charge accumulations (or portions thereof) in the semiconductor, originally in response to an input signal, can be shifted through the semiconductor sequentially between adjacent MOS capacitors by a sequence of (clock) electrical voltage pulses applied to the electrodes. Signal charges are initially injected at the input end of a chain of such MOS capacitors, in accordance with a stream of digital or analog information, for example, in the form of signal controlled injected charges into a first transfer site of the CTD at the appropriate moments of the clock voltage pulse sequence.

It should be understood of course that ordinarily in present-day semiconductor charge transfer devices, the semiconductor medium is silicon and the oxide is silicon dioxide; however, other suitable semiconductor-insulator combinations may be used in general. Thus, in particular, the term "oxide" in connection with the CTD's can refer to any such suitable insulator.

In general, charge transfer devices suffer from the problem that the signal input, particularly in the case of analog signal input, results in an input charge to the CTD which depends upon the local surface channel characteristic of the semiconductor wafer ("chip") substrate, particularly the threshold gate voltage for forming a surface "inversion" layer in the input gate region of the semiconductor in the vicinity of the first CTD transfer site. Thus, a given signal input in two different CTD's located in two different semiconductor substrates (or in two CTD's located in the same chip but somewhat removed from each other) results in different output signals from the two CTD's. This discrepancy of output is particularly undesirable in arrays of semiconductor CTD's for optical image sensing purposes, for example. Therefore, it would be desirable to have an input circuitry for CTD's which would have the advantageous feature that the input signal charges be linear analogs of the signal voltage and be substantially independent of the surface characteristics of the input region of the CTD's.

SUMMARY OF THE INVENTION

The input charge to a semiconductor charge transfer device can be made substantially independent of the surface characteristics of the semiconductor, and linearly dependent on an input signal voltage, by means of an input circuit which transports signal-independent charge injected from an "input diode" source (reverse biased P-N junction) across an "input gate" semiconductor surface region to the first transfer site in the semiconductor surface region directly underneath a first transfer electrode of the transfer device, and then transports a signal-dependent amount of charge back through the input gate region to the input diode. (The input gate region is generally the semiconductor surface channel layer region between the input diode and the first transfer site of the CTD.) In this way, the charge remaining in the first transfer site, for subsequent shifting through the remainder of the CTD, is substantially independent of the characteristic of the input gate channel in the semiconductor.

In a specific embodiment of this invention, a charge transfer device includes an array of electrodes on an oxide layer on the surface of a single-crystal semiconductor body of one-conductivity type. All electrodes in the array except the first electrode are subjected to sequential clock voltages, for example a three-phase cycle, as known in the art. The first electrode, denoted by the input gate electrode, is subjected to a voltage in accordance with the signal charge desired to be transferred to the remainder of the shift register device. A reverse-biased P-N junction (input diode), including a localized surface zone of opposite conductivity from that of the remainder of the semiconductor body, serves as an injecting source of electrical charges for subsequent transfer through the CTD. This input diode is pulsed with signal-independent voltages at the beginning of the first clock phase pulse, thereby injecting charges through the input gate region to the first transfer site in the surface region of the semiconductor. Subsequently, at a time advantageously less than one-half through the duration of the first clock phase pulse, the input diode pulse is terminated; and thereby the initially transported charges in the first transfer site are then transported back to the input diode in accordance with the voltage signal then being applied to the input gate electrode. In this way the charge remaining at the first transfer site of the CTD is independent of the surface channel characteristics in the input gate region, but depends only upon the signal voltage during the first clock pulse. In particular, this charge is directly proportional to the signal voltage measured from a certain level, thereby furnishing an analog signal charge for future transfer through the remainder of the device in response to conventional shift register operation thereof.

BRIEF DESCRIPTION OF THE DRAWING

This invention, together with its features, objects and advantages, may be better understood from the following detailed description when read in conjunction with the drawing in which:

FIGS. 2.1, 2.2 and 2.3 are graphical plots of voltages versus time, useful in describing the operation of the circuitry depicted in FIG. 1.

For the sake of clarity only, none of the Figures is drawn to scale.

DETAILED DESCRIPTION

Figure 1:
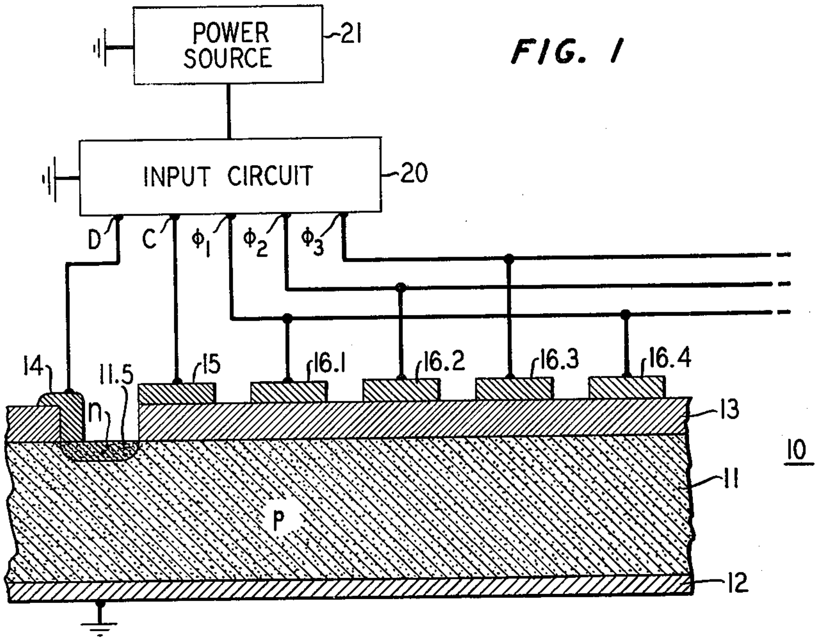
FIG. 1 is a schematic diagram, partly in cross section, of semiconductor shift register apparatus with input signal circuitry in accordance with a specific embodiment of this invention.
Figure 1:
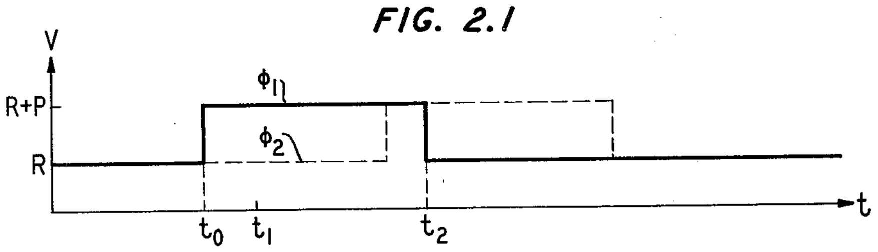
Figure 1:
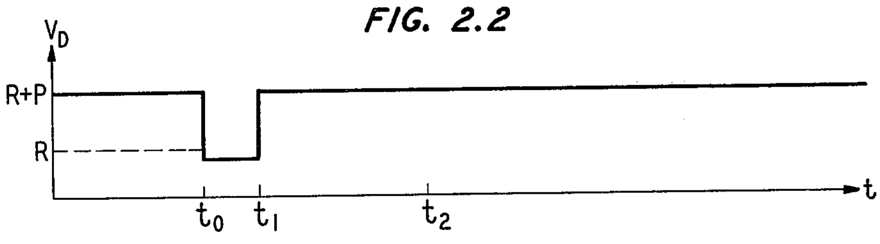
Figure 1:
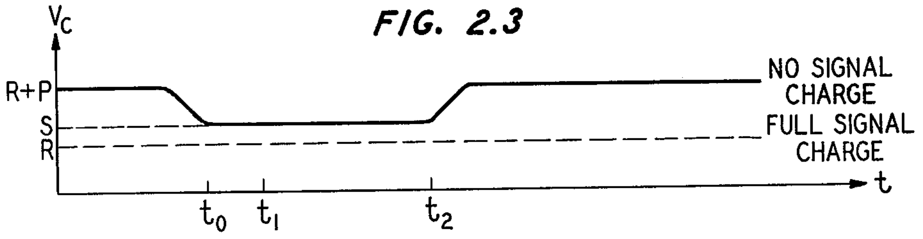

As shown in FIG. 1, a semiconductor charge transfer device 10 includes a monocrystalline semiconductor body 11, of p-type silicon for example. A metal layer 12, in ohmic contact with the bottom major surface of the semiconductor body 11, furnishes a contact for the maintenance of the bulk of the body 11 at electrical ground potential. The top major surface of the body 11 is coated with a silicon dioxide layer 13 having an aperture therein for ohmic contact by an input diode electrode layer 14 with an n-type localized surface zone 11.5 in the body 11. On the exposed surface of the oxide layer 13 is located an array of electrodes, including an input gate electrode 15 followed by a sequence of electrodes 16.1, 16.2, 16.3, 16.4, etc.; of which electrode 16.1 is the first transfer electrode, controlling the voltage at the first transfer site in the localized top surface region of the body 11 directly underneath this electrode 16.1. The voltage potentials at any moment on all the electrodes 14, 15, 16.1, 16.2, 16.3, 16.4, etc., are controlled by input circuitry 20 fed by a power source 21. The input circuit 20 contains output terminals labeled (from left to right) D, C, $\Phi_1$, $\Phi_2$ and $\Phi_3$, as shown in FIG. 1. For applying an input diode voltage $V_D$ to the electrode 14, the terminal D is connected to this electrode 14 which makes ohmic contact with the n-type surface zone 11.5. For applying an input gate signal voltage $V_C$, the terminal C is connected to the input gate electrode 15. Terminals $\Phi_1$, $\Phi_2$ and $\Phi_3$ are sequentially connected to electrodes 16.1, 16.2, 16.3, 16.4, etc., in accordance with known three-phase CTD prior art.

For the purposes of description of the operation of the apparatus 10, it should be noted that the electrode layer 14 together with the n-type zone 11.5 serve as a source for injection of electrical charges into the body 11. In operation, as shown in FIG. 2.1, the clock voltages of terminals $\Phi_1$ and $\Phi_2$ are applied as a function of time as indicated. In particular, the active clock pulse phase of $\Phi_1$ begins at a time $t_o$ and terminals at time $t_2$, while the active clock pulse phase of $\Phi_2$ commences at a time slightly before this termination time $t_2$ of the clock pulse phase of $\Phi_1$. As further indicated by the labels R and R+P in FIG. 2.1, a reference voltage level R corresponds to the resting (passive) phase of any clock cycle, whereas the voltage level R+P corresponds to the pulse (active) phase, that is, the reference voltage plus the clock pulse voltage. For simplicity of the drawing only, the clock phase $\Phi_3$ has been omitted from FIG. 2.1; but it should be understood, as known in the art, that the pulse phase of the clock phase $\Phi_3$ commences slightly before the termination of the active pulse phase of the clock phase $\Phi_2$. During a given clock cycle while all these various clock phases are sequentially applied to the electrodes 16.1, 16.2, 16.3, 16.4, etc., the voltages to the input diode electrode 14 and to the input gate electrode 15 are applied by the input circuitry 20 as follows. The voltage $V_D$ applied to the input diode electrode 14 through the terminal D is advantageously signal independent in all cases, and this voltage is advantageously made equal to R+P at all times except for a beginning portion of the active pulse phase of $\Phi_1$, that is, the beginning time interval from $t_o$ to $t_1$, during which the voltage $V_D$ (FIG. 2.2) is typically made less than R, but $V_D$ is advantageously not made so low that the consequently injected charges immediately flow past the second transfer site in the semiconductor underneath the electrode 16.2. For useful operation, $t_1$ is less than about one-half the way from $t_o$ to $t_2$, and advantageously is less than about one-third thereof. Thus, a negative-going pulse (typically slightly greater than P) is applied to the input diode at this beginning portion of the $\Phi_1$ active phase. As a consequence of this negative-going pulse in combination with the positive-going clock pulse of $\Phi_1$ then being applied to electrode 16.1, electrons are injected from the input diode (localized surface zone 11.5) into the body 11 in the surface gate regions thereof underneath electrodes 15. These injected electrons are transported (by reason of the clock voltage pulse of $\Phi_1$) to the first transfer site directly underneath electrode 16.1 in an amount which is independent of the input signal voltage then being applied to the input gate electrode 15, so long as an input gate signal voltage $V_C$ being applied to this electrode 15 lies in the range between R and R+P (FIG. 2.3). After time $t_1$, the negative-going pulse applied to the electrode 14 through the terminal D is terminated, and then a certain fraction of electrons which have accumulated in the first transfer site (under the first transfer electrode 16.1) will then be transported back to the input diode (surface zone 11.5) in an amount which depends upon the input gate signal voltage $V_C$ applied to the input gate electrode 15 especially during the time interval $t_1$ to $t_2$. Assuming that a constant input gate voltage $V_C = S$ is applied to the electrode 15 (FIG. 2.3) for the entire time interval $t_0$ to $t_2$, the amount of charge which will be left behind underneath the first transfer electrode 16.1 (and which will be available for further transfer to sites sequentially underneath electrodes 16.2, 16.3 . . . ) will be directly proportional to the distance on the voltage scale (FIG. 2.3) of the voltage level S from the voltage level R+P. In particular, all the charge previously accumulated underneath the first transfer electrode 16.1 will be transported back to the surface zone 11.5 if the input gate signal voltage $V_C$ is made equal to R+P during the time interval $t_o$ to $t_2$ thereby leaving no signal charge for further transfer through the CTD 10. Thus, the voltage applied to the input gate electrode 15 during $t_o$ to $t_2$ determines what fraction of the charges originally transported from the localized zone 11.5 to the region in the body 11 underneath the electrode 16.1 will then be transported back to the surface zone 11.5.

There is a simple relation between the signal voltage level S and the input signal charge Q, which remains behind (for further shift register transfer) in the first transfer site. In terms of the signal voltage level $S$ applied to the input gate electrode 15 during the time interval from $t_o$ to $t_2$:

$$Q = C(R+P-S)$$

where C is the capacitance of the metal-oxide-semiconductor structure formed by the electrode 16.1 with the regions of the oxide layer 13 and of the semiconductor body 11 directly underneath this electrode. Thus, if the voltage level S is made equal to R+P, no signal charge remains behind in the first transfer site for further CTD transfer; whereas if S is made equal to R, then substantially all ("full signal charge") of the charge initially transported from the input diode to the first transfer site by the end of time $t_1$ remains in this first transfer site for subsequent transfer through the remainder of the CTD. Moreover, the amount of charge Q in response to voltage levels S between R and (R+P) is directly proportional to the magnitude of S − (R+P); thereby, the charge Q is an analog representation of the signal voltage level S, and is substantially independent of the surface channel characteristic of the input gate semiconductor region under the input gate electrode 15, as desired in this invention. The voltage level for $V_C$ equal to R+P can thus be considered as a bias level, and deviations therefrom as a signal. After this charge Q has been transferred to the first transfer electrode 16.1, this charge is shifted sequentially to electrodes 16.2, 16.3, 16.4, etc., in accordance with conventional charge transfer device principles.

Advantageously, the electrodes 16.1, 16.2, 16.3, 16.4, etc., are all substantially identical in geometric form at least in the regions over the operating charge transfer surface region of the body 11. Moreover, the input gate electrode 15 likewise has similar operative geometric contours to that of the first transfer electrode 16.1. It should be noted that advantageously the n-type zone 11.5 is always under a reverse voltage bias with respect to the bulk of the semiconductor body 11 (to prevent uncontrollably large charge injection).

In order to reduce the amount of noise in the input signal, it is advantageous that the first transfer electrode 16.1 be clock-pulsed independently from the other electrodes corresponding to the first phase of the clock. In addition, the voltage applied to the first transfer electrode 16.1 can be selected to be a DC voltage rather than a clock pulse, the DC level being approximately equal to R+P, again to achieve low noise levels on the input signal. The time $t_0$ in such a case is measured as the commencement of the $\Phi_1$ clock pulse applied to every third electrode beginning with electrode 16.4.

Typical values for the voltage level R range from about 0. to 5. volts, and 10. to 15. volts for R+P. Thus P is typically about 10. volts. The negative-going pulse in the time interval $t_0$ to $t_1$ of the voltage $V_D$ brings $V_D$ to a value below the level R by typically 1. or 2. volts; but $V_D$ should never itself go below about 1. volt thereby (to prevent injected charges from immediately flowing past the second transfer site beneath the electrode 16.2).

While the invention has been described in terms of a specific embodiment, various modifications can be made without departing from the scope of the invention. For example, two-phase clock cycle CTDs may be used instead of the three-phase described above, by appropriate modifications known in the art. See for example, the article "Two-Phase Stepped Oxide CCD Shift Register Using Undercut Isolation" in *Applied Physics Letters*, Vol. 20, No. 11, pp. 413–414 (June 1, 1972). The principles of this invention can be equally well utilized in a bucket-brigade type device rather than a charge-coupled device depicted in FIG. 1. Moreover, other modified forms of charge transfer devices (C4D), such as described in U.S. Pat. No. 3,739,240 issued to R. H. Krambeck on June 12, 1973 ("Buried Channel Charge Coupled Devices") or in an article entitled "A Fundamental Comparison of Incomplete Charge Transfer in Charge Transfer Devices," appearing in the *Bell System Technical Journal*, Vol. 52, No. 2, pp. 147–181 at pp. 164–166 (February, 1973), can be improved in the input signal charge injection by a similar application of the principles of this invention. For instance, multiple level electrodes can be used for the charge transfer device as described in U.S. Pat. No. 3,651,349 issued to D. Kahng et al., Mar. 21, 1972. In such a case, for example with two levels of electrodes, there will be two input gates followed by the first transfer electrode. The first input gate is subjected to voltages just as described above for the input gate 15; however, the second input gate is subjected to a similar or larger voltage pulse as the first transfer electrode, commencing at the same time as that of the first transfer electrode but persisting for not quite so long a time interval as that for the first transfer electrode. Also, n-type and p-type semiconductor conductivity can be interchanged with suitable changes of applied voltages; and semiconductors other than silicon can be used in the practice of the invention, such as germanium. Finally, the signal voltage level during time $t_0$ to $t_2$ need not be constant, in which case the effective signal for producing the charge Q will be a function of said signal voltage.

What is claimed is:

1. Control circuitry for a semiconductor signal charge transfer device, having an input source region which can feed charge to an input gate region in turn which can transport charge to a first transfer site in response to applied voltages, which comprises:

a. first circuit means for applying a clock voltage pulse to an electrode controlling the voltage potential at the first transfer site;

b. second circuit means for applying a charge injecting voltage pulse to the input source for a first time period during the duration of the clock voltage pulse sufficient for the transport of a predetermined signal-independent charge from said diode to the first transfer site; and c. third circuit means for applying a voltage bias plus a signal voltage pulse to an input gate electrode controlling the voltage at the gate region for a second time period which outlasts the clock pulse (which in turn outlasts the injecting pulse), so that an amount of said signal-independent charge is retransported from the first transfer site through the gate region back to the input source subsequently to the first time period but before the termination of the clock voltage pulse in accordance with said signal voltage.

2. Control circuitry according to claim 1 in which the level of said bias voltage is substantially equal to that of the clock voltage pulse.

3. Control circuitry according to claim 2 in which the time period is less than about one-half of the duration of the clock voltage pulse.

4. Control circuitry according to claim 3 in which the time period is less than about one-third of the said duration.

5. Control circuitry according to claim 2 in which the input source includes a P-N junction in the semiconductor.

6. Control circuitry according to claim 1 in which the time period is less than about one-third of said duration.

7. Control circuitry according to claim 1 in which the input source includes a P-N junction in the semiconductor.

8. Semiconductor apparatus which comprises:

a. a semiconductor charge transfer device having an input source which can feed charge to an input gate region in turn which can transport charge to a first transfer site in response to electrical voltages;

b. first circuit means for applying a clock voltage pulse to an electrode controlling the voltage potential at the first transfer site;

c. second circuit means for applying a charge injecting voltage pulse to the input diode for a first time period during the duration of the clock voltage pulse sufficient for the transport of a predetermined signal independent charge pulse from said source to the first transfer site; and d. third circuit means for applying a voltage bias plus a signal voltage pulse to an input gate electrode controlling the voltage at the gate region for a second period which outlasts the clock pulse (which, in turn, outlasts the injecting pulse), so that an amount of said signal independent charge is retransported back from the first transfer site through the gate region to the input source subsequent to the first time period but before the termination of the clock voltage pulse in accordance with said signal voltage.

9. Semiconductor apparatus according to claim 8 in which the magnitude of said bias voltage is substantially equal to that of the clock voltage pulse.

10. Semiconductor apparatus according to claim 9 in which the time period is less than about one-half of the duration of the clock voltage pulse.

* * * * *

UNITED STATES PATENT OFFICE

CERTIFICATE OF CORRECTION

PATENT NO. : 3,881,117

DATED : April 29, 1975

INVENTOR(S) : Michael F. Tompsett

It is certified that error appears in the above-identified patent and that said Letters Patent are hereby corrected as shown below:

Column 3, line 50, change "terminals" to --terminates--.

Signed and Sealed this

*twenty-sixth* Day of *August 1975*

[SEAL]

*Attest:*

RUTH C. MASON
*Attesting Officer*

C. MARSHALL DANN
*Commissioner of Patents and Trademarks*